United States Patent [19]

Hagler et al.

[11] Patent Number: 4,520,457
[45] Date of Patent: May 28, 1985

[54] KEY-CONTROLLED METHOD FOR INVOKING AUTOMATIC ROW AND COLUMN ADDITION IN AN INTERACTIVE TEXT PROCESSING SYSTEM

[75] Inventors: Brenda J. Hagler, Georgetown; James T. Repass, Round Rock, both of Tex.

[73] Assignee: International Business Machines Corporation, Armonk, N.Y.

[21] Appl. No.: 311,085

[22] Filed: Oct. 13, 1981

[51] Int. Cl.³ .................. G06K 1/20; G06F 3/023
[52] U.S. Cl. .................................................. 364/900
[58] Field of Search .............. 364/200, 900, 401, 406, 364/700, 701, 728, 512; 340/712, 726, 825.19, 790

[56] References Cited

U.S. PATENT DOCUMENTS

| | | | |
|---|---|---|---|
| 4,053,735 | 10/1977 | Foudos | 364/401 |
| 4,118,695 | 10/1978 | Ogawe et al. | 340/790 |
| 4,198,685 | 4/1980 | Corwin et al. | 364/900 |
| 4,241,521 | 12/1980 | Dufresne | 340/825.19 |
| 4,334,286 | 6/1982 | Kerigan et al. | 364/900 |

OTHER PUBLICATIONS

Robert E. Ramsdell, "The Power of VisiCalc", Byte, Nov. 1980, pp. 190-192.

*Primary Examiner*—Gareth D. Shaw
*Assistant Examiner*—Daniel K. Dorsey
*Attorney, Agent, or Firm*—Richard E. Cummins

[57] ABSTRACT

A method is disclosed for assisting the operator of an interactive text processing system to add a list of numbers that have been entered into the system during the creation of a document. The method involves the operator positioning the cursor adjacent the first number in the sequence by operating the cursor move keys. The next step involves the operator pressing and holding either the "column add" or the "row add" function key while watching the movement of the cursor from the first number in the sequence to succeeding numbers in the sequence until the cursor is positioned adjacent the last number in the sequence, at which time the function key is released. The last step in the process is for the operator to press the Enter key which enters the total into the system for subsequent processing and displays the total in the appropriate location on the display. The provision in the system for the operator to total a sequence of displayed numbers by means of a function key which is made typamatic greatly enhances operator efficiency and system throughput.

5 Claims, 4 Drawing Figures

```
Page 1
Line #
04
05
06
07
08
09                  Assets                      1977 . . . . .     1973
10
11   Current assets:
12       Cash                                $  4,200. . . . .  $ 10,678
13       Receivables - less allowance for
14           doubtful receivables               5,678. . . . .     3,456
15       Marketable securities                 11,037. . . . .     4,567
16       Inventories                            4,078. . . . .     2,980
17       Prepaid expenses                       2,221. . . . .     3,231
18           Total current assets              27,214. . . . .    23,801
19
20
21   Property equipment and automobiles:
22       Land                                 138,960. . . . .   120,000
 .
 .
 .
 .
 .
46           Total stockholder's equity       184,055. . . . .    91,471
47           Total liabilities and
48               stockholder's equity        $250,131. . . . .  $132,025
```

FIG. 3

KEY-CONTROLLED METHOD FOR INVOKING AUTOMATIC ROW AND COLUMN ADDITION IN AN INTERACTIVE TEXT PROCESSING SYSTEM

DESCRIPTION

1. Background of the Invention

This invention relates in general to interactive text processing systems having a keyboard, a display screen, a printer and a microprocessor, and, in particular, to an improved method for generating and entering during creation of a document the arithmetic total of a displayed sequence of numbers disposed in either a row or a column.

2. Description of Prior Art

The prior art has disclosed various interactive text processing systems. These systems generally comprise a keyboard, a display screen for displaying text that is entered into the system by an operator, a microprocessor, and an output printer. Generally, a program is supplied to the system from a diskette storage device and stored in the memory of the microprocessor.

In text processing systems which are currently commercially available, the program provides several functions. In most systems, a portion of the program is devoted to what can be referred to as operator guidance, the objective being to make it as simple as possible for the operator to perform a desired task. In order to guide the operator, the program causes a series of "menus" to be sequentially displayed to the operator and prompts selection of one or more of the available options listed on the menus by the operator. Based on the sequence of selected options, the microprocessor enables other programs be accessed which control the interaction of the keyboard, display and storage devices to permit the completion or execution of the desired task in an interactive mode.

In the creation of certain financial type documents, it is often necessary to enter in the text a column of numbers which require a total at the end. Alternately, the numbers may be arranged in a horizontal row with the total at the right side of the row. An example of the latter type of entry is a monthly financial spread sheet with a yearly total at the rightmost entry.

The numbers are generally entered in the column format with the aid of tab stops, and some systems will automatically align the decimal points of separate numerical entries. At the end of the column, a space is left for the total to be inserted. In one known system, the totalizing of the column is achieved by the operator placing the text system in an arithmetic mode and positioning the cursor to the left of the first number in the column to be added by operating the cursor move keys in an appropriate manner. The operator then actuates the column add key which places the first number in an accumulator and displays it on the screen at the position of the total line. The operator then actuates the cursor down key to position the cursor adjacent the second number to be added. When the column add key is again activated, the second number is then added to the accumulator and again displayed on the total line. The operator continues the two-key step operation for each number in the column to be added until the last number is reached. When the total has been generated, the operator then presses the enter key and the total is stored for subsequent printout when the document is printed.

The operator is involved in an identical process when the numbers are arranged in a horizontal row, except that the cursor right move key is employed in place of the cursor down key, and the row add key is used in place of the column add key.

While the above arrangements operate satisfactorily where the need to total columns and rows is somewhat limited, it has been found that the process can be tiring to an operator if a large quantity of additions are required. As a result, errors occur and operator efficiency is decreased.

SUMMARY OF THE INVENTION

The present invention is directed to an improved method which is considered faster for the operator and involves less risk of error. The improved method is similar in concept to the function of certain keys which are made typamatic—that is, they repeat automatically when the key is held depressed, generally at a rate that is considerably faster than could be achieved by single keystrokes. The present invention permits the operator to add a sequence of numbers by merely pressing and holding down a designated key, such as the column add key, which causes the cursor to be positioned to the next sequential number and the addition step to occur repeatedly as long as the key is depressed.

It is, therefore, an object of the present invention to provide an improved method in an interactive text processing system for the operator to total a sequence of numbers.

It is a further object of the present invention to simplify the method that an operator of an interactive text processing system employs to add a sequence of displayed numbers disposed either in a row or column arrangement.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 3 is a copy of a typical document which can be created by the system shown in FIG. 1;

DESCRIPTION OF THE PREFERRED EMBODIMENT

Figure 1:
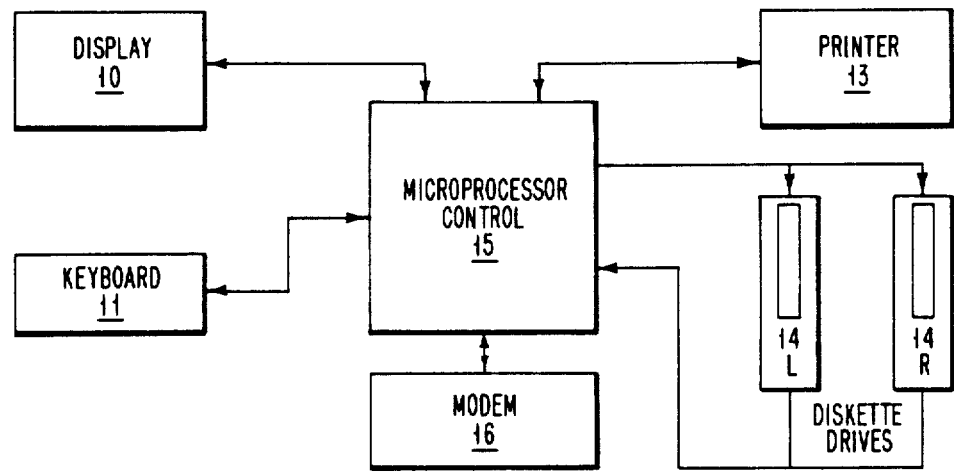
FIG. 1 is a functional diagram of an interactive text processing system in which the present method may be employed.

With reference to FIG. 1, a typical interactive text processing system is illustrated in which the method of the present invention is advantageously employed. The major components of the system shown in FIG. 1 comprise the display device 10, the keyboard 11, the printer 13, the diskette storage devices 14L and 14R, and the microprocessor 15 which includes an internal memory for storing programs and data entered from the keyboard 11 or from the diskette storage devices 14L and 14R. Device 14 functions to store data on either a single-sided diskette at density D1 only or to store data on a two-sided diskette at double density D2. The 2S2D diskette, therefore, can store four times the information stored on the 1S1D diskette. A modem 16 is also shown in FIG. 1 and functions to permit the system to communicate with other similar text processing systems or to a data processing system.

Figure 2:
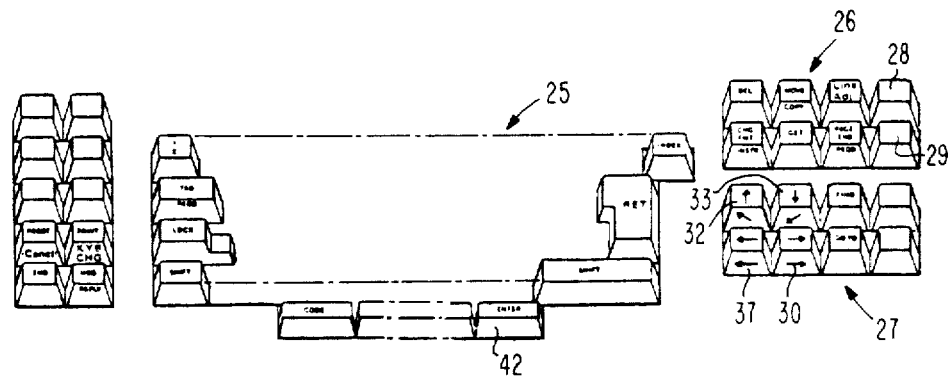
FIG. 2 is a view of a portion of the keyboard shown as a functional block in FIG. 1 in which the column add and row add keys are disposed.

The system, as shown in FIG. 1, is activated by the operator turning on the power and inserting a basic text processing program diskette into one of the diskette drives 14L or 14R. The basic program diskette is an S1D1 type diskette and, since an S1D1 type diskette can be read by either device, either device may be used. The system automatically reads the appropriate sector of track 0 to initialize the system. This involves reading into the memory of the microprocessor the IPL program and programs for displaying menus and programs for causing the system to perform the tasks indicated by the menus or for directing the operator to other diskettes when the programs to accomplish the selected tasks are not on the operating diskette. After the system has been initialized, a task selection menu is displayed to the operator on display device 10 listing the various tasks which the operator may perform by selecting one of the options on the displayed menu. The operator interacts with the display and keyboard such that the system receives the necessary information for the system to perform the selected task. The keyboard, as shown in FIG. 2, is a conventional keyboard of an interactive text processing system and includes a standard character section 25, the function key section 26, and the cursor control key section 27.

The function key section includes a column add key 28 and a row add key 29, while the cursor control section 27 includes the cursor right key 30, the cursor left key 31, the cursor up key 32, and the cursor down key 33. The column add key 28 and row add key 29 are dedicated function keys in that their function never changes. These keys are typamatic in that when they are held down their function is repeated automatically. If desired, the column add key and the row add function key may be obtained from general purpose function keys whose personalities, characters or functions are established by the operator following a simple algorithm which assigns the desired function to a special key for a limited period of time as is well known the prior art.

The manner in which a key is made typamatic in a text processing system which includes a microprocessor to capture keystrokes is well-known in the art. The particular subroutines to achieve this function will depend on the instruction set of the microprocessor and the interaction of the processor with the keyboard and the other elements of the system.

After the system has been IPLed and the initial task selection menu is displayed to the operator as a result of the basic text processing task programs having been read into the system, the operator selects the typing task by keying in an appropriate identifying character assigned to that option on the menu. As a result of selecting the typing task menu, program modules necessary to implement typing tasks will be transferred into the system from the diskette and a sequence of one or more menus will be presented to the operator who enters requested data into the system, such as format data, on the column and row layout of the document to be created, as shown in FIG. 3.

Figure 4:
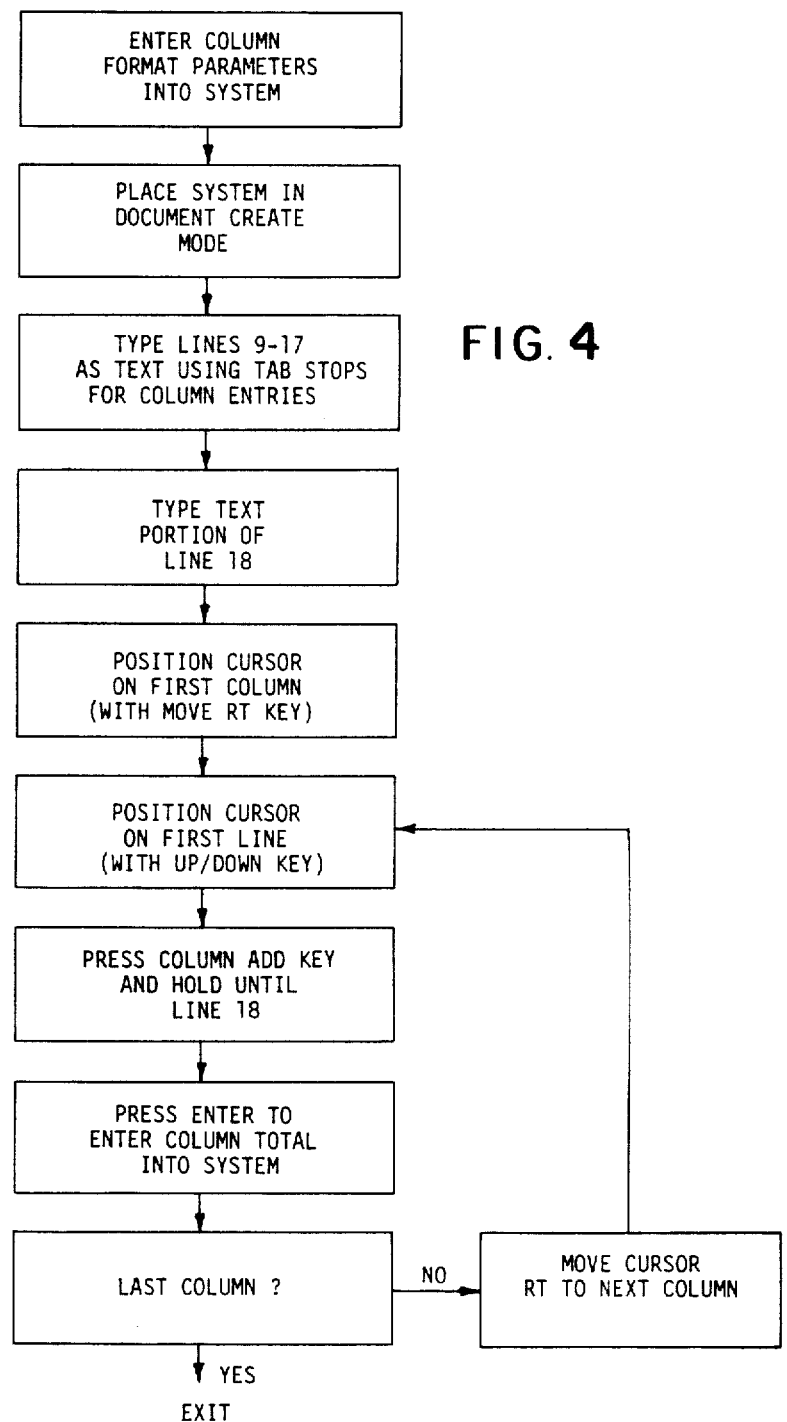
FIG. 4 is a flow chart of the steps involved in the addition of the numbers in the columns shown in the document of FIG. 3.

The operator then enters the text entry mode where the text beginning on line 9 of FIG. 3 is entered and displayed. The operator continues entering the data through all of the text data on line 18. After the word "assets" is entered, the operator positions the cursor at a point relative to the first entry in column 1. In the preferred embodiment, the cursor is positioned initially adjacent the first character in the first line, which in this case is the dollar sign. The next step in the process, as identified by block 50 in FIG. 4, is for the operator to depress and hold the column add 28 in FIG. 2. The system adds the first entry of column 1 to the contents of an accumulator and stores the result back into the accumulator register which is displayed in a highlighted fashion in the total fields on line 18 of column 1 or the accumulator could be displayed at some convenient location, such as on the prompt line. The system then steps the cursor to the next entry in column 1, i.e., line 14, and that subtotal is then displayed. As long as the operator holds the column add key depressed, successive entries in column 1 are accumulated and displayed. The operator releases the key when the cursor reaches line 18. The total of column 1 is displayed on line 18 and will be entered into the system by the operator pressing the Enter key 42.

A similar operation occurs in connection with the row add function key. The cursor is stepped horizontally and the number on the second line, i.e., row, in the successive columns are accumulated. In both column and row add functions when the number of entries that can be displayed is less than the number to be added, the system will automatically scroll vertically or horizontally until the operator releases the key or until the field for the total is reached. The accumulated subtotals are displayed at some convenient location in the same manner as the column add function.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. In an interactive text processing system having a display screen including a positionable cursor, a microprocessor including a memory, and an accumulator, and a keyboard to permit entry of data and control information into said system by an operator interactively, an improved method for assisting said operator in adding a plurality of numbers which are displayed in sequential positions on said display screen, said numbers being stored in said memory at memory locations which can be determined in accordance with the displayed position of said cursor on said screen, said method comprising the steps of said operator:
  a. positioning said cursor on said screen adjacent the first number of said plurality to be added;
  b. positioning and holding one key which has been pre-programmed for a predetermined function to cause said processor to:
    (1) add said first number to a number stored in said accumulator to define a subtotal which is stored in said accumulator,
    (2) step said cursor to said next number in said sequential positions to cause said system to develop a new said subtotal, and
    (3) repeat steps (1) and (2) for each said number in said sequence until said one key is released; and
  c. releasing said one key when said cursor is moved adjacent to said last number of said plurality in said sequence whereby the typamatic operation of said one key causes said numbers in said sequence to be sequentially added to said accumulator as long as said one key is held depressed.

2. The method recited in claim 1 in which said sequence of numbers is arranged in a columnar format, said cursor is stepped downwardly to the next line, and said number in said accumulator is displayed on said screen in a predetermined location.

3. The method recited in claim 1 in which said sequence of numbers is arranged in a horizontal way, said cursor is stepped horizontally to the next number in said sequence, and said number in said accumulator is displayed on said screen in a predetermined location.

4. The method recited in claim 2 or claim 3 further including the step of pressing a second key which functions to enter the displayed contents of said accumulator into said system at a location in said memory corresponding to the position of said cursor when said second key is depressed.

5. The method recited in claim 4 in which said one key is a dedicated function key.

* * * * *